United States Patent
Peters et al.

(10) Patent No.: US 12,248,878 B2
(45) Date of Patent: Mar. 11, 2025

(54) DEVICE AND METHOD FOR TRAINING A NEURONAL NETWORK

(71) Applicant: Robert Bosch GmbH, Stuttgart (DE)

(72) Inventors: Jorn Peters, Amsterdam (NL); Thomas Andy Keller, Amsterdam (NL); Anna Khoreva, Stuttgart (DE); Max Welling, Amsterdam (NL); Priyank Jaini, Amsterdam (NL)

(73) Assignee: ROBERT BOSCH GMBH, Stuttgart (DE)

( * ) Notice: Subject to any disclaimer, the term of this patent is extended or adjusted under 35 U.S.C. 154(b) by 1042 days.

(21) Appl. No.: 17/180,383

(22) Filed: Feb. 19, 2021

(65) Prior Publication Data
US 2021/0287093 A1 Sep. 16, 2021

(30) Foreign Application Priority Data
Mar. 10, 2020 (EP) .................... 20162157

(51) Int. Cl.
*G06N 3/082* (2023.01)
*G05D 1/00* (2024.01)
(Continued)

(52) U.S. Cl.
CPC ......... *G06N 3/082* (2013.01); *G06F 18/2414* (2023.01); *G06N 3/04* (2013.01); *G06N 3/045* (2023.01); *G06N 3/088* (2013.01); *G05D 1/0088* (2013.01); *G06N 3/008* (2013.01)

(58) Field of Classification Search
CPC ........ G06N 20/00; G06N 20/10; G06N 20/20; G06N 3/008; G06N 3/02; G06N 3/04;
(Continued)

(56) References Cited

U.S. PATENT DOCUMENTS

2019/0294860 A1* 9/2019 Jin ..................... G06N 3/045
2021/0248467 A1* 8/2021 Mohamed ............ G06F 9/3455

FOREIGN PATENT DOCUMENTS

EP          1752362 A1   2/2007
WO     2019180414 A1    9/2019

OTHER PUBLICATIONS

Han, et al.: "Pretraining Convolutional Neural Networks for Image-Based Vehicle Classification", Advances in Multimedia, 2018 (2018), article 3138278, pp. 1-10, XP055726277.
(Continued)

*Primary Examiner* — Shane D Woolwine
(74) *Attorney, Agent, or Firm* — NORTON ROSE FULBRIGHT US LLP; Gerard A. Messina (57) ABSTRACT

A method for training a neural network. The neural network comprises a first layer which includes a plurality of filters to provide a first layer output comprising a plurality of feature maps. Training of the classifier includes: receiving, by a preceding layer, a first layer input in the first layer, wherein the first layer input is based on the input signal; determining the first layer output based on the first layer input and a plurality of parameters of the first layer; determining a first layer loss value based on the first layer output, wherein the first layer loss value characterizes a degree of dependency between the feature maps, the first layer loss value being obtained in an unsupervised fashion; and training the neural network. The training includes an adaption of the parameters of the first layer, the adaption being based on the first layer loss value.

11 Claims, 9 Drawing Sheets

(51) Int. Cl.
   *G06F 18/2413* (2023.01)
   *G06N 3/008* (2023.01)
   *G06N 3/04* (2023.01)
   *G06N 3/045* (2023.01)
   *G06N 3/088* (2023.01)

(58) Field of Classification Search
   CPC .......... G06N 3/045; G06N 3/08; G06N 3/082; G06N 3/088; G05D 1/0088; G06F 18/2414
   See application file for complete search history.

(56) References Cited

OTHER PUBLICATIONS

Hayat, et al.: "Deep Reconstruction Models for Image Set Classification", IEEE Transactions on Pattern Analysis and Machine Intelligence, IEEE Computer Society, USA, 37(4), (2015), pp. 713-727, P011574166.

Sermanet. et al.: "Pedestrian Detection with Unsupervised Multi-Stage Feature Learning", 2013 IEEE Computer Society Conference on Computer Vision and Pattern Recognition, Jun. 23, 2013, pp. 3626-3633, XP032492965.

Shan, et al.: "Pixel and Feature Level Based Domain Adaption for Object Detection in Autonomous Driving", arxiv.org, Cornell University Library, (2018), pp. 1-8, XP081088764.

Zhang, et al.: "Augmenting Supervised Neural Networks with Unsupervised Objectives for Large-scale Image Classification", arxiv.org, Cornell University Library, (2016), pp. 1-17, XP080709912.

* cited by examiner

DEVICE AND METHOD FOR TRAINING A NEURONAL NETWORK

CROSS REFERENCE

The present application claims the benefit under 35 U.S.C. § 119 of European Patent Application No. EP 20162157.0 filed on Mar. 10, 2020, which is expressly incorporated herein by reference in its entirety.

FIELD

The present invention relates to a method for training a neuronal network, a method for using a neuronal network, a method for operating an actuator, a computer program and a machine-readable storage medium, a neuronal network, a control system, and a training system.

BACKGROUND INFORMATION

European Patent No. EP 1 752 362 describes an approach for training a neural network in an unsupervised fashion.

SUMMARY

Machine-learning-based classifiers, like e.g., neural networks, extract knowledge from image data in order to learn a classification function. For this, they comprise a plurality of parameters which can be adapted to influence the classification behavior. For the best performing classifiers, the number of parameters can easily exceed $10^9$. Here, performance can be understood as a measure for how well a neuronal network is able to predict a desired class.

Especially in safety-critical applications, obtaining as high of a performance as possible is paramount. Consider, for example, using a neuronal network as part of a perception pipeline of an at least partially autonomous vehicle for detecting pedestrians in the vicinity of the vehicle. In this scenario, information about the detected pedestrians can be used to, e.g., compute a safe trajectory for navigating the vehicle's environment. If a pedestrian is incorrectly classified, e.g., missed by the classifier, it may cause the system to plan a trajectory that leads right through the pedestrian. This may, in turn, lead to severe injuries and or death.

An advantage of a method in accordance with an example embodiment of the present invention is that it regularizes a neuronal network during training, which leads to an increased performance of the classifier.

Regularization is beneficial for training as it mitigates overfitting in a neuronal network. The enormous number of parameters would otherwise make a neuronal network susceptible to overfitting, i.e., learning certain data points by heart. In turn, overfitting leads to an erosion of the performance of the classifier.

Another advantage of the method according to the example embodiment of the present invention is that it does not impose any constraints with respect to having to use specific layers in a predefined structure as is necessary for, e.g., flow-based models. This allows for freely adapting the classifier to the characteristics of the training data at hand, which in turn leads to a better performance of the classifier.

In a first aspect, the present invention is concerned with a method for training a neuronal network, wherein the classifier comprises at least one first layer, and wherein the first layer comprises a plurality of filters to provide a first layer output comprising a plurality of feature maps. In accordance with an example embodiment of the present invention, training of the classifier comprises the steps of:

Receiving a first layer input from a preceding layer in the first layer, wherein the first layer input is based on the input signal;

Determining the first layer output based on the first layer input and a plurality of parameters of the first layer;

Determining a first layer loss value based on the first layer output, wherein the first layer loss value is a measure of dependence between the feature maps of the first layer output, further wherein the first layer loss value is obtained in an unsupervised fashion;

Training the neural network, wherein training comprises an adaption of the parameters of the first layer, wherein the adaption is based on the first layer loss value.

A neuronal network is understood to comprise one or more layers of linear and/or nonlinear units, which are used to predict an output signal for a received input signal.

The layers are organized in a topology in which an order of the layers is determined by the flow of information. If an initial layers provides input to another layer, the other layer is considered to follow the initial layer while the initial layer precedes the other layer.

The output provided by a layer may be in accordance with current values of a respective set of parameters. The parameters of the layers are understood to belong to the parameters of the classifier.

An advantage of this layered design is that the different layers provide increasingly abstract representations of the input signal. Layers, which occur early in a neuronal network, typically extract low-level representations of the input signal, which can encode information such as, e.g., in the case of image data, edges while layers, which occur later in the classifier, can extract high-level representations encoding information about, e.g., objects or parts of objects.

When being provided an input signal, each layer of the classifier may provide a layer output to one or multiple other layers of the classifier, wherein a layer output may comprise a plurality of feature maps. Feature maps can be considered representations of the input of a certain layer, which are obtained using some form of transformation. For example, in convolutional layers, the feature maps are obtained by applying one or more filters of a predefined height and width to the layer's input. The outputs of such a convolutional layer are as many feature maps as there are filters in the layer. Preferably, these feature maps can be organized in a tensor which is of the same height and width as are the feature maps, while the number of outputs, i.e., the number of feature maps, determine the depth of the tensor. This tensor can be used as output of the convolutional layer. Each filter can comprise a plurality of parameters that may be adapted during training.

In general, a neuronal network can receive data of various modalities as input signal, especially sensor image data as provided by video, radar, LIDAR and/or ultra-sonic sensors as well as images provided by thermal cameras. The input signal may also comprise audio data as provided by one or more microphones, e.g., in the form of a quantized audio signal or a spectral image.

The data comprised in the input signal may also be synthetically generated. For image data, this can be achieved by, e.g., using a computer-implemented method for creating a virtual environment in a computer and rendering images based on, e.g., a physical model. Alternatively, synthetic images may be obtained using a generative machine learning model, e.g., a Generative Adversarial Network or a flow-based model.

For audio data, synthetic data may be generated by composing different audio signals in a computer. Alternatively, it can also be envisioned that audio data is synthesized by a machine learning method, e.g., WaveNet.

The data comprised in the input signal can be provided by a sensor and/or a synthetization approach directly. Alternatively, the data may also be provided by some form of storage unit, which comprises previously recorded or synthesized data.

The input signal may also comprise a plurality of input data also known as batch of data. In this case, the classifier may predict output signals for each datum in the batch.

The output of the classifier can be considered a prediction about the input signal it is provided based on the classifier's knowledge, which is encoded through the parameters of the classifier.

In the context of the present invention, a neuronal network is understood to comprise a first layer which can be trained in an unsupervised fashion. For this, the first layer computes a first layer loss value which characterizes the dependence between feature maps of the first layer output. The first layer output may be obtained from the first layer input through, e.g., a discrete convolution operation. In this case, the parameters of the first layer can be used as weights for the filters of the convolution operation.

Training of the first layer based on the first layer loss may be carried out without requiring a backpropagation algorithm as is otherwise common for training classifiers, e.g., neural networks. Instead, the weights may be updated by running, e.g., a gradient descent algorithm using the first layer loss. For this, the gradient of the first layer loss with respect to the first layer weights may computed.

When trained with the method described in the first aspect of this invention, a neuronal network is able to extract information from the supplied training data (i.e., the data used for training) in an unsupervised fashion. The term unsupervised may be understood as the classifier not requiring additional information from a human being, e.g., in the form of annotations (also known as labels).

This is advantageous as acquiring labels is a very time consuming task. In order to obtain reliable labels, a human expert has to assign them to the training data. Given a fixed amount of time, one can gather more data by just obtaining it in comparison to having to obtain the same data and labeling it. As training data is used for "teaching" the classifier about a certain problem, more data allows for learning more about this problem. This leads to an increased performance of the classifier.

For example, consider the case of an autonomous vehicle, where the classifier is used as part of a perception pipeline for detecting pedestrians around the vehicle. The perception pipeline may comprise sensors and software components. While the sensors may be configured to sense information about the environment of the vehicle, the software components may infer higher level information such as position of pedestrians in the sensed information. This higher level information may be used for, e.g., planning a safe route without colliding with any of the pedestrians. It can be further envisioned that the training data for this pedestrian detector is obtained from a fleet of vehicles collecting data from a suitable sensing device, e.g., a camera, a radar or a LIDAR.

It can be envisioned that there exists a vast amount of rare pedestrians in the data such as, e.g., pedestrians wearing a costume. While these pedestrians may be covered in the data, it is too time consuming for a human to go through all the data and search for the rare pedestrians.

The current approach for situations like the one in the example above is to sample a random subset of the data, which is designated for labelling. This data is then later used for training the, e.g., pedestrian detector.

However, it is very likely that this approach of gathering training data misses a considerable amount of rare events as the subset of data to be labeled is typically small compared to the entire dataset of recorded data.

However, the entire dataset can be used in an unsupervised training of the pedestrian detector. Afterwards, the pedestrian detector may then be further trained with a potentially limited amount of training data. As rare events are much more likely to be covered in the dataset recorded from the fleet than in the smaller training dataset, this enables the pedestrian detector to also learn information from the unlabeled but valuable data. In turn, this improves the performance of the pedestrian detector.

Another advantage of the example training method in accordance with the present invention is that it is able to train a neuronal network such that it is able to be fine-tuned for a downstream task while incorporating information from unlabeled data.

An advantage of learning independent feature maps in the classifier is that the classifier is able to infer high-level concepts from the data without being given explicit labels. For example, it is known that Independent Component Analysis is able to learn high-level concepts such as objects from an input signal. The first aspect can be seen to comprise a form of non-linear Independent Component Analysis into training the classifier. This allows the classifier to learn non-linear relations in the data which in turn leads to learning highly discriminative features of elements contained in the input signals.

This may be especially advantageous if the classifier trained this way is fine-tuned for a classification task, as the output layer of the classifier does already output highly discriminative features before fine-tuning. This reduces the time necessary for fine-tuning the classifier as the classification task becomes much easier to learn. In turn, this also saves memory of the computer used for training as well as reduces the number of necessary computations which in turn reduces the energy consumption.

It is understood that decreasing the dependence between the feature maps in the first layer output can be achieved by decreasing the first layer loss value.

In another aspect of the present invention, the training the neural network may further include the steps of:
  Determining an output signal from the neural network, wherein the output signal depends on the first layer output, wherein the output signal characterizes a classification of the input signal;
  Determining a classification loss value based on the output signal;
  Training the neural network, wherein training comprises an adaption of the parameters of the first layer, wherein the adaption is based on the classification loss.

Training the neural network this way enables it to be used as classifier. The term classifier can be understood as a device, which is configured to determine one or many class labels for an input signal or parts thereof.

The result can in turn be used to control a device. For example, a classifier may be employed as part of a perception pipeline of an at least partly autonomous vehicle. In this scenario, the classifier can be used, e.g., to detect whether the vehicle is currently located in an urban neighborhood, a rural area or a highway. This information may in turn be used in order to activate and/or deactivate certain driving functions, driving maneuvers and/or speed limitations when the vehicle is operated at least partly autonomously.

In general, a classifier may determine different kinds of class labels. For example, it can determine whether an object is present or not at a certain location of an image. This approach is known as object detection. Using the example of an at least partly autonomous vehicle, object detection can be used to detect other road participants, especially pedestrians, other vehicles and cyclists, in order to, e.g., plan a collision-free trajectory through the environment.

Another common task that a classifier can be used for is semantic segmentation. Here, each element of the input signal, e.g., each pixel of an input image, is assigned a class label from the classifier. Using the example from above, the classifier may be used to classify each pixel of a camera image as belonging to either a drivable or a non-drivable space. This information can be used alternatively or additionally to information about other road participants in order to determine a safe trajectory through the environment.

The output signal of a classifier can be considered a prediction based on the input signal. This prediction may be incorrect if the model is insufficient for a given datum. In this sense, performance of the classifier may be understood as a measure for how well a classifier is able to predict a desired class label. If the classification output is used as part of controlling a device, it is of high importance to achieve as high of a performance as possible as incorrect classifications may cause unwanted and/or unsafe behavior of the device.

An advantage of training the neural network with an additional classification loss is that it can be used as a classifier while enforcing a regularization training. Regularization increases a classifier's performance. In turn, the example method increases the performance of the neural network when used as a classifier compared to if the neural network was simply trained using the training data.

This may be advantageous as a high performance leads to a better and/or safer behavior of a device which bases its actions on the classification of a classifier.

For example, consider the example of an autonomous vehicle, wherein the classifier is used in order to detect pedestrians around the vehicle. The information about detected pedestrians may be used for, e.g., planning a collision-free trajectory. If the performance of the classifier is not good enough, it may miss a pedestrian until the vehicle is already close to the pedestrian. Then the classifier does detect the pedestrian and initiate an emergency brake to not collide with the pedestrian.

If the classifier is configured and/or trained according to the first aspect of the present invention, the performance is increased and the pedestrian may be detected. In turn, this leads to the vehicle being able to plan a collision-free route without the necessity of an emergency brake. Planning routes this way allows for reducing emergency maneuvers such as emergency brakes which in turn reduces the wear on components, e.g., the brakes, of the vehicle.

It is understood that the classification performance of the classifier can be increased by decreasing the classification loss value.

In another aspect of the present invention, the first layer loss value is determined based on a change of the distribution of the first layer input to a desired distribution for the first layer output.

The input of the first layer may be viewed as a concrete realization of a first random variable. This random variable may be transformed into a second random variable which has certain desirable properties. In this case, the first layer output would then follow the distribution of the second random variable and may hence obtain the desired characteristics. For example, the desired independence between feature maps may be a desired characteristic of the second random variable.

An advantage of this approach is hence to enable the first layer output to obtain certain desirable characteristics, e.g., independence between feature maps. This acts as a regularization when used for training a neural network for a specific classification task.

Another advantage is, that the neural network may be trained using the first layer loss as a stand-alone loss. This allows for obtaining a pretrained neural network. This pretrained neural network may further be used as starting point to train a classifier. As the classifier obtains a good initialization from the pretraining, training the classifier converges at a much higher rate. This allows the classifier to be achieve a higher performance using less training time.

In another aspect of the present invention, the method for training the neural network further comprises the step of:

Pruning the filters of the first layer ($L_1$)

Pruning can be understood as removing certain filters of the layers of a neural network. This has the effect of lowering the amount of parameters of the neural network. If applied during training, this acts as a regularization. In addition, removing the number of parameters reduces the amount of memory necessary to store the neural network. Additionally, as the number of parameters is reduced, the neural network requires less computation operations for obtaining the output signal.

In turn, this leads to the neural network consuming less energy and being able to provide the output signal faster. For training, obtaining an output signal faster may be viewed as equivalent to being able to process more training data in a specified amount of time. In turn this leads to the neural network being able to extract more information from the training data and hence increases its performance.

In another aspect of the present invention, it can be envisioned that the first layer loss value characterizes a factoring of the distribution of the first layer output between feature maps.

The advantage of this extension is that it allows for an efficient way to impose independence between feature maps. For example, it can be imagined that the first layer outputs are trained such that their distribution is a multi-variate standard normal distribution. This way, independence between the feature maps may be added by construction due to the fact that the multi-variate standard normal distribution factorizes over the random variables which in this case can be understood to be the feature maps of the first layer output.

In a further aspect, it can be envisioned that in the first layer loss value is determined according to the formula:

$$l(i) = \log(p(z)) + \log\left(\left|\det\left(\frac{\partial z}{\partial i}\right)\right|\right),$$

$$p(z) = \prod_{j=1}^{C_{out}} A_j \cdot \exp(b_j(\sum z_j^2)^\alpha),$$

wherein $C_{out}$ is the number of feature maps in first layer output, $A_j$, $\alpha$ and $b_j$ are predefined values and $z_j$ is the j-th feature map.

This may have the advantage that decreasing the loss value is equivalent to reducing the dependency between individual feature maps in the first layer output. In addition, if the first layer comprises bijective transformations as is the case for, e.g., convolutional and fully connected layers, the first layer can be trained individually without the necessity of back-propagating an error gradient through the entire neural network. This effectively reduces the amount of memory necessary for training the classifier as each first layer can be trained individually.

If the neural network is used for classification, this layer-wise training may be applied in a pre-training step before fine-tuning the neural network with the labeled training dataset. This pre-training effectively reduces the training time of the entire system, which in turn even further saves memory and energy.

In another aspect of the present invention, $A_j$ and/or $b_j$ and/or $\alpha$ are adapted during training of the classifier.

Allowing these parameters to be trained enables the neural network to learn the characteristics of the provided data even further. This leads to an improvement in the prediction performance of the neural network.

In another aspect of the present invention, it can be envisioned that the step of determining the first layer output comprises a padding of the first layer input such that the size of the first layer output matches the size of the first layer input along the height and/or width and/or depth.

In general, the output of a first layer does not have to be of the same shape, i.e., height, width and depth, as the input. However, if layer-wise training shall be applied, the projection from input to output can preferably be chosen to be bijective. If for a first layer the output shape does not match the input shape, the first layer input can hence be padded along the necessary dimensions in order to obtain an equally sized output compared to the original input.

An advantage of this approach is that it reduces the restrictions on the architecture, i.e., the configuration of the layers, of the neural network. In turn, this allows for adapting the architecture depending on the characteristics of the data used for training. This leads to an increased performance as the architecture can be tuned with respect to the data.

Example embodiments of the present invention are discussed with reference to the figures in more detail below.

DETAILED DESCRIPTION OF EXAMPLE EMBODIMENTS

Figure 1:
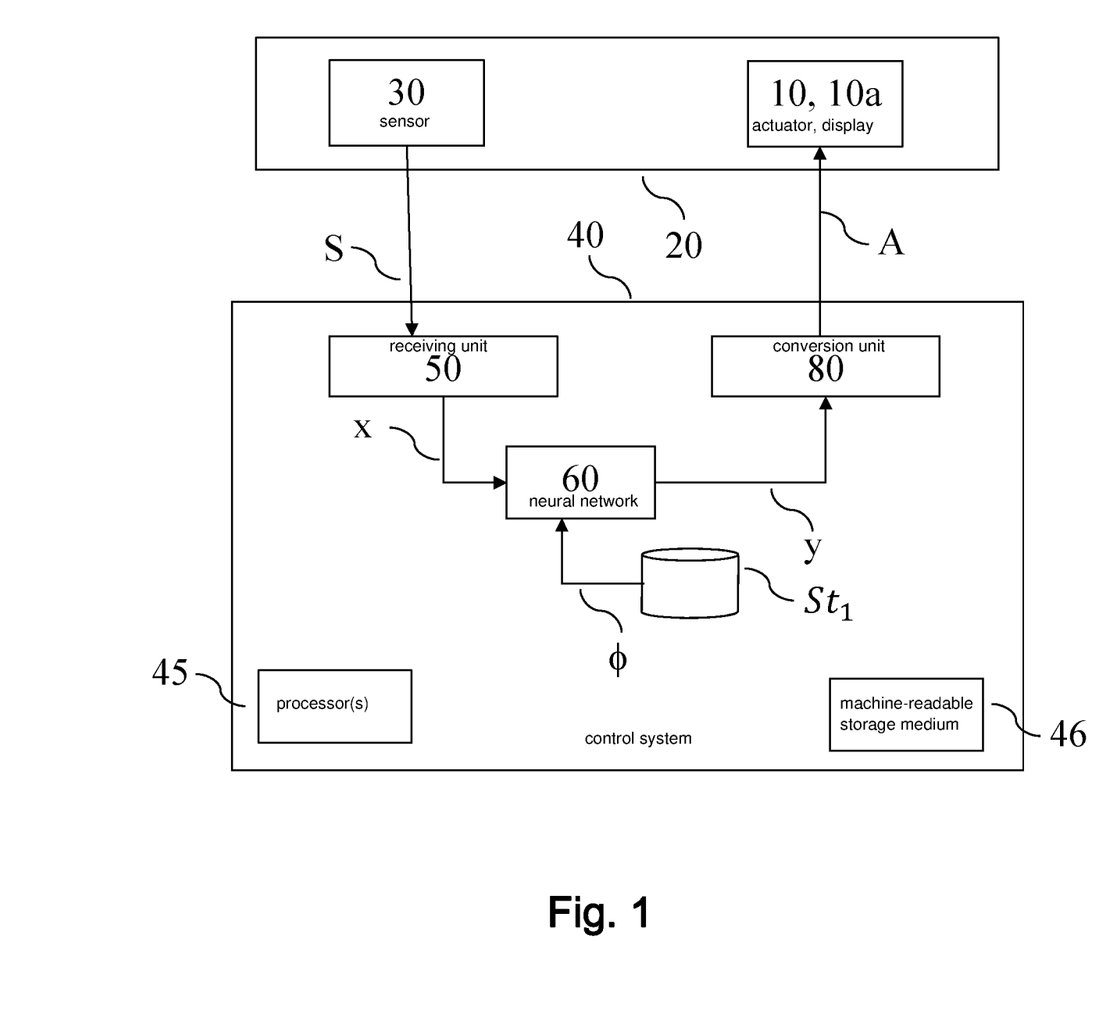
FIG. 1 shows a control system comprising a classifier controlling an actuator in its environment, in accordance with an example embodiment of the present invention.

Shown in FIG. 1 is an example embodiment of an actuator (10) in its environment (20). The actuator (10) interacts with a control system (40). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of actuator control commands (A) depending on the stream of sensor signals S, which are then transmitted to actuator (10).

Control system (40) receives the stream of sensor signals (S) of sensor (30) in an optional receiving unit (50). Receiving unit (50) transforms the sensor signals (S) into input signals (x). Alternatively, in case of no receiving unit (50), each sensor signal (S) may directly be taken as an input signal (x). Input signal (x) may, for example, be given as an excerpt from sensor signal (S). Alternatively, the sensor signal (S) may be processed to yield input signal (x). Input signal (x) comprises image data corresponding to an image recorded by the sensor (30). In other words, the input signal (x) is provided in accordance with the sensor signal (S).

The input signal (x) is then passed on to a neural network (60).

The neural network (60) is parametrized by parameters ($\theta$), which are stored in and provided by a parameter storage ($St_1$).

The neural network (60) determines an output signal (y) from the input signals (x). The output signal (y) comprises information that assigns one or more labels to the input signal (x). The output signal (y) is transmitted to an optional conversion unit (80), which converts the output signal (y) into the control commands (A). The actuator control commands (A) are then transmitted to the actuator (10) for controlling the actuator (10) accordingly. Alternatively, the output signal (y) may directly be taken as actuator control commands (A).

The actuator (10) receives actuator control commands (A), is controlled accordingly and carries out an action corresponding to the actuator control commands (A). The actuator (10) may comprise a control logic which transforms an actuator control command (A) into a further control command, which is then used to control actuator (10).

In further embodiments, the control system (40) may comprise a sensor (30). In even further embodiments, the control system (40) alternatively or additionally may comprise an actuator (10).

In one embodiment, the neural network (60) may be designed to identify lanes on a road ahead, e.g. by classifying a road surface and markings on said road, and identifying lanes as patches of road surface between said markings. Based on an output of a navigation system, a suitable lane for pursuing a chosen path can then be selected, and depending on a present lane and said target lane, it may then be decided whether a vehicle (100) is to switch lanes or stay in the present lane. The actuator control command (A) may then be computed by e.g. retrieving a predefined motion pattern from a database corresponding to the identified action.

Likewise, upon identifying road signs or traffic lights, depending on an identified type of road sign or an identified state of said traffic lights, corresponding constraints on possible motion patterns of the vehicle (100) may then be retrieved from e.g. a database, a future path of the vehicle (100) commensurate with the constraints may be computed, and the actuator control command (A) may be computed to steer the vehicle (100) such as to execute said trajectory.

Likewise, upon identifying pedestrians and/or vehicles, a projected future behavior of said pedestrians and/or vehicles may be estimated, and based on the estimated future behavior, a trajectory may then be selected such as to avoid collision with the identified pedestrians and/or vehicles, and the actuator control command (A) may be computed to steer the vehicle (100) such as to execute said trajectory.

In still further embodiments, it can be envisioned that the control system (40) controls a display (10a) instead of an actuator (10).

Furthermore, the control system (40) may comprise a processor (45) (or a plurality of processors) and at least one machine-readable storage medium (46) on which instructions are stored which, if carried out, cause the control system (40) to carry out a method according to one aspect of the invention.

Figure 2:
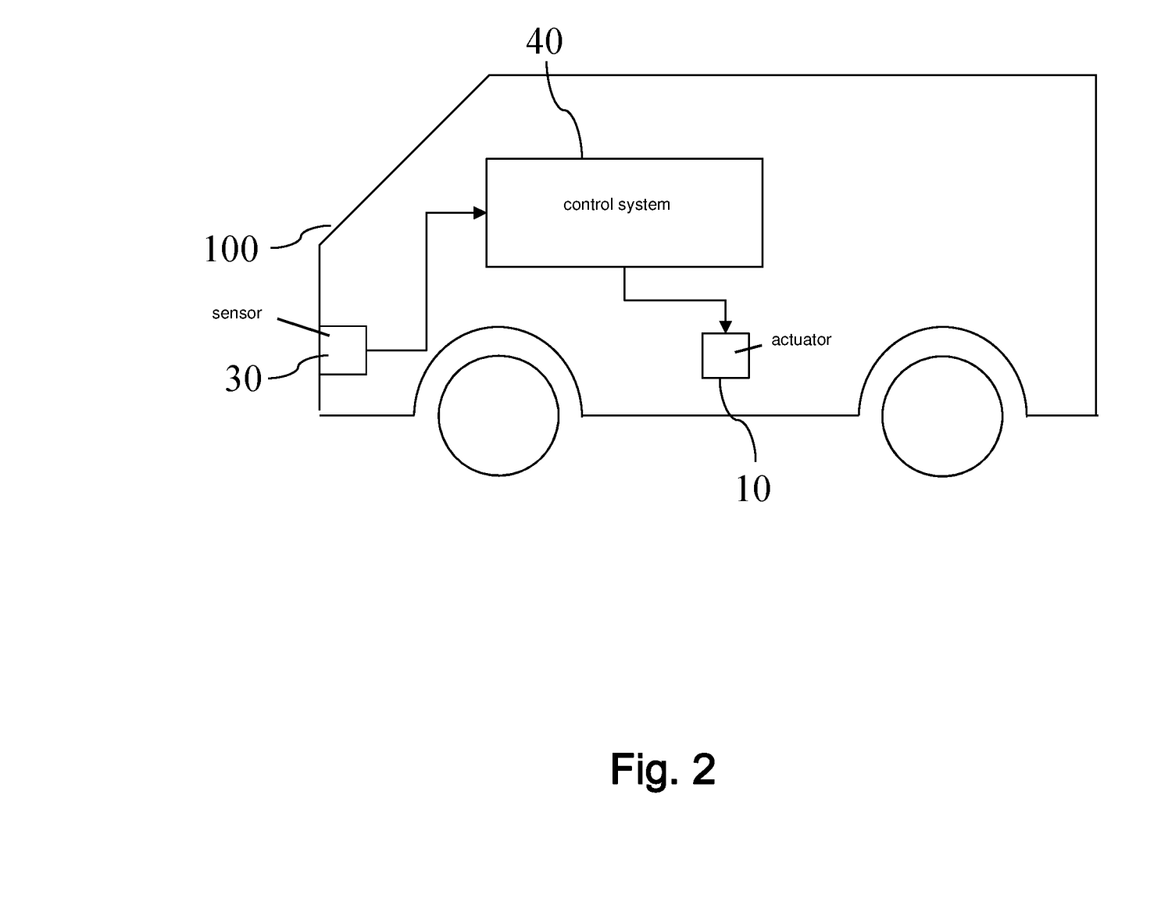
FIG. 2 shows the control system controlling an at least partially autonomous robot, in accordance with an example embodiment of the present invention.

FIG. 2 shows an embodiment in which the control system (40) is used to control an at least partially autonomous robot, e.g. an at least partially autonomous vehicle (100).

The sensor (30) may comprise one or more video sensors and/or one or more radar sensors and/or one or more ultrasonic sensors and/or one or more LiDAR sensors and or one or more position sensors (like e.g. GPS). Some or all of these sensors are preferably but not necessarily integrated in the vehicle (100).

Alternatively or additionally, the sensor (30) may comprise an information system for determining a state of the actuator system. One example for such an information system is a weather information system which determines a present or future state of the weather in the environment (20).

For example, using the input signal (x), the neural network (60) may, for example, detect objects in the vicinity of the at least partially autonomous robot. The output signal (y) may comprise an information which characterizes where objects are located in the vicinity of the at least partially autonomous robot. The actuator control command (A) may then be determined in accordance with this information, for example to avoid collisions with the detected objects.

The actuator (10), which is preferably integrated in the vehicle (100), may be given by a brake, a propulsion system, an engine, a drivetrain, or a steering of the vehicle 100. Actuator control commands (A) may be determined such that actuator (or actuators) (10) is/are controlled such that vehicle (100) avoids collisions with said detected objects. Detected objects may also be classified according to what the classifier (60) deems them most likely to be, e.g. pedestrians or trees, and the actuator control commands (A) may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the actuator command control (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, an actuator control command (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g. an optical sensor, may detect a state of an object which is to undergo processing by the household appliance. For example, in the case of the domestic appliance being a washing machine, the sensor (30) may detect a state of the laundry inside the washing machine. The actuator control command (A) may then be determined depending on a detected material of the laundry.

Figure 3:
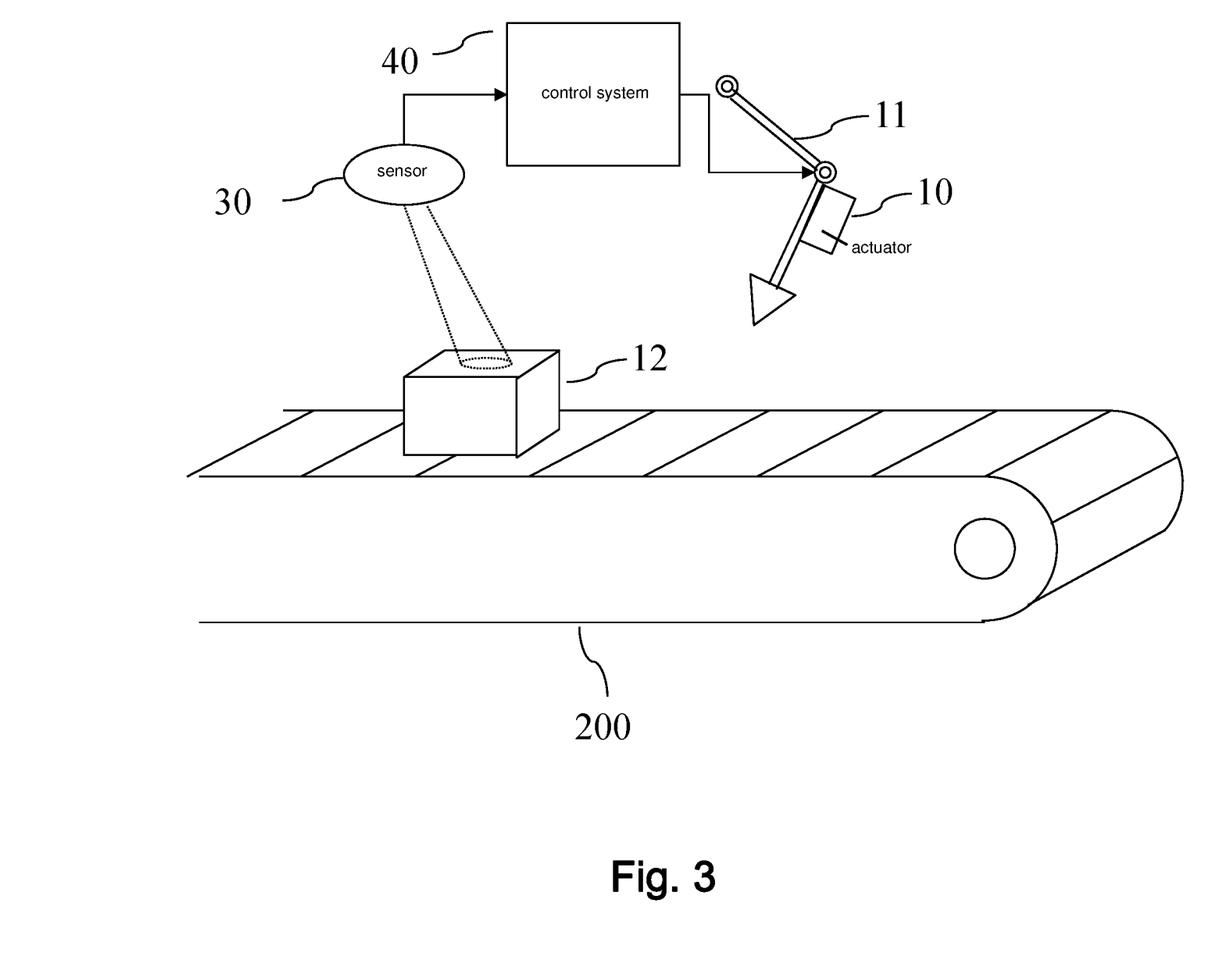
FIG. 3 shows the control system controlling a manufacturing machine, in accordance with an example embodiment of the present invention.

Shown in FIG. 3 is an embodiment in which the control system (40) is used to control a manufacturing machine (11), e.g., a punch cutter, a cutter or a gun drill, of a manufacturing system (200), e.g. as part of a production line. The control system (40) controls an actuator (10) which in turn control the manufacturing machine (11).

The sensor (30) may be given by an optical sensor which captures properties of, e.g., a manufactured product (12). The classifier (60) may determine a state of the manufactured product (12) from these captured properties. The actuator (10) which controls the manufacturing machine (11) may then be controlled depending on the determined state of the manufactured product (12) for a subsequent manufacturing step of the manufactured product (12). Alternatively, it may be envisioned that the actuator (10) is controlled during manufacturing of a subsequent the manufactured product (12) depending on the determined state of the manufactured product (12).

Figure 4:
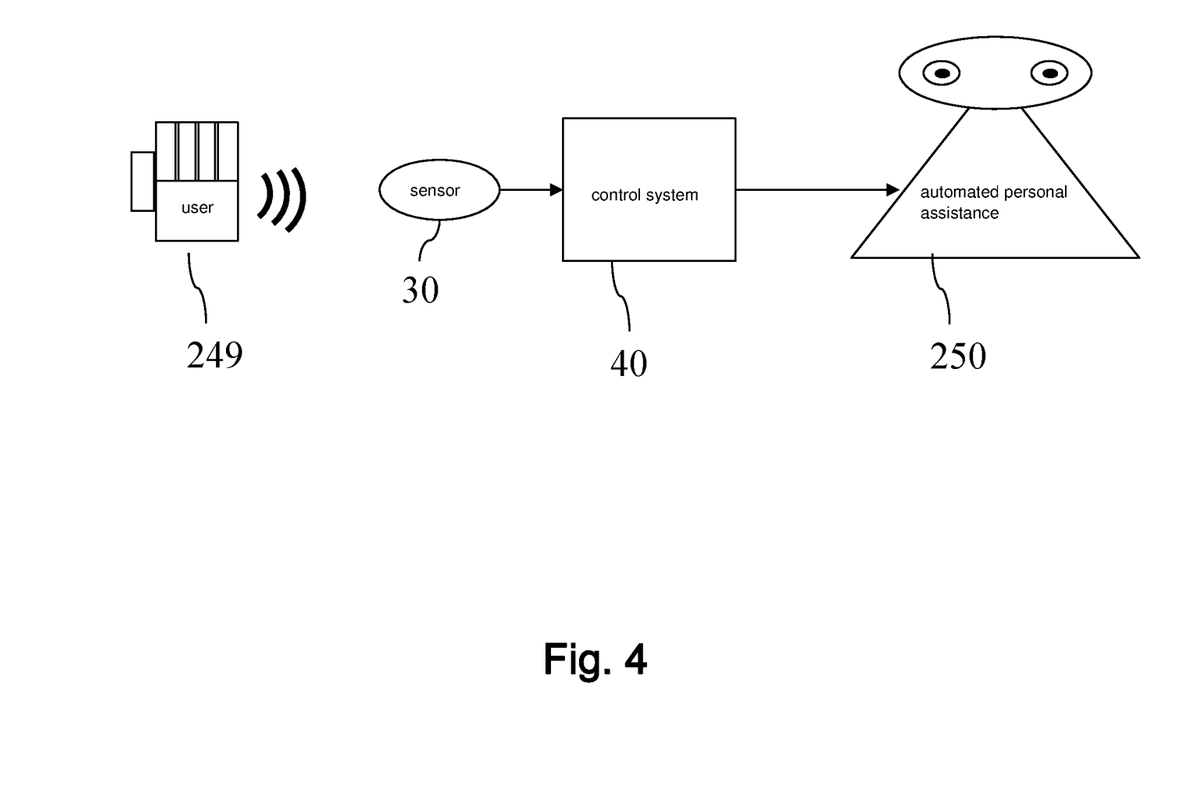
FIG. 4 shows the control system controlling an automated personal assistant, in accordance with an example embodiment of the present invention.

Shown in FIG. 4 is an embodiment in which the control system (40) is used for controlling an automated personal assistant (250). The sensor (30) may be an optic sensor, e.g. for receiving video images of a gestures of a user (249). Alternatively, the sensor (30) may also be an audio sensor, e.g., for receiving a voice command of the user (249).

The control system (40) then determines actuator control commands (A) for controlling the automated personal assistant (250). The actuator control commands (A) are determined in accordance with the sensor signal (S) of the sensor (30). The sensor signal (S) is transmitted to the control system (40). For example, the neural network (60) may be configured to, e.g., carry out a gesture recognition algorithm to identify a gesture made by the user (249). The control system (40) may then determine an actuator control command (A) for transmission to the automated personal assistant (250). It then transmits the actuator control command (A) to the automated personal assistant (250).

For example, the actuator control command (A) may be determined in accordance with the identified user gesture recognized by the classifier (60). It may then comprise information that causes the automated personal assistant (250) to retrieve information from a database and output this retrieved information in a form suitable for reception by the user (249).

In further embodiments, it may be envisioned that instead of the automated personal assistant (250), the control system (40) controls a domestic appliance (not shown) controlled in accordance with the identified user gesture. The domestic appliance may be a washing machine, a stove, an oven, a microwave or a dishwasher.

Figure 5:
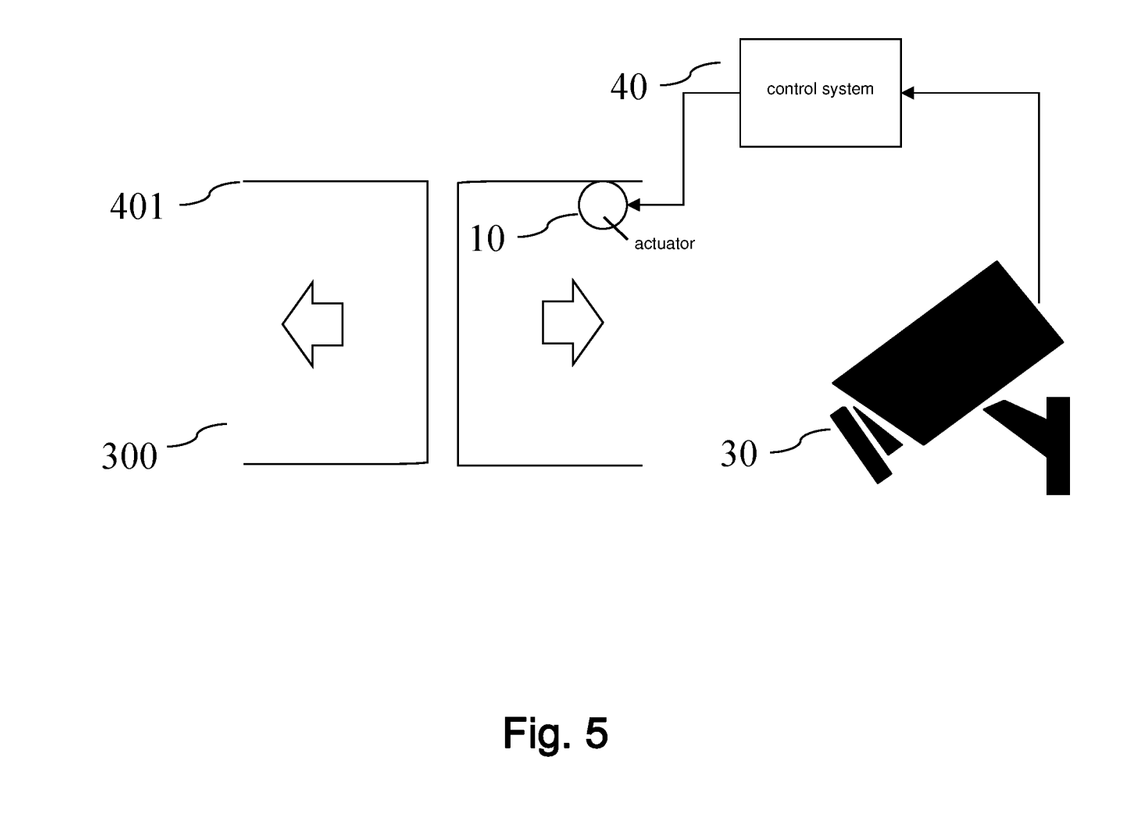
FIG. 5 shows the control system controlling an access control system, in accordance with an example embodiment of the present invention.

Shown in FIG. 5 is an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may for example be an optical sensor for providing image or video data, e.g., for detecting a person's face. The classifier (60) may be configured to interpret this image or video data, e.g., by matching identities with known people stored in a database, thereby determining an identity of the person. The actuator control signal (A) may then be determined depending on the interpretation of the neural network (60), e.g., in accordance with the determined identity. The actuator (10) may be a lock which grants access or not depending on the actuator control signal (A). A non-physical, logical access control is also possible.

Figure 6:
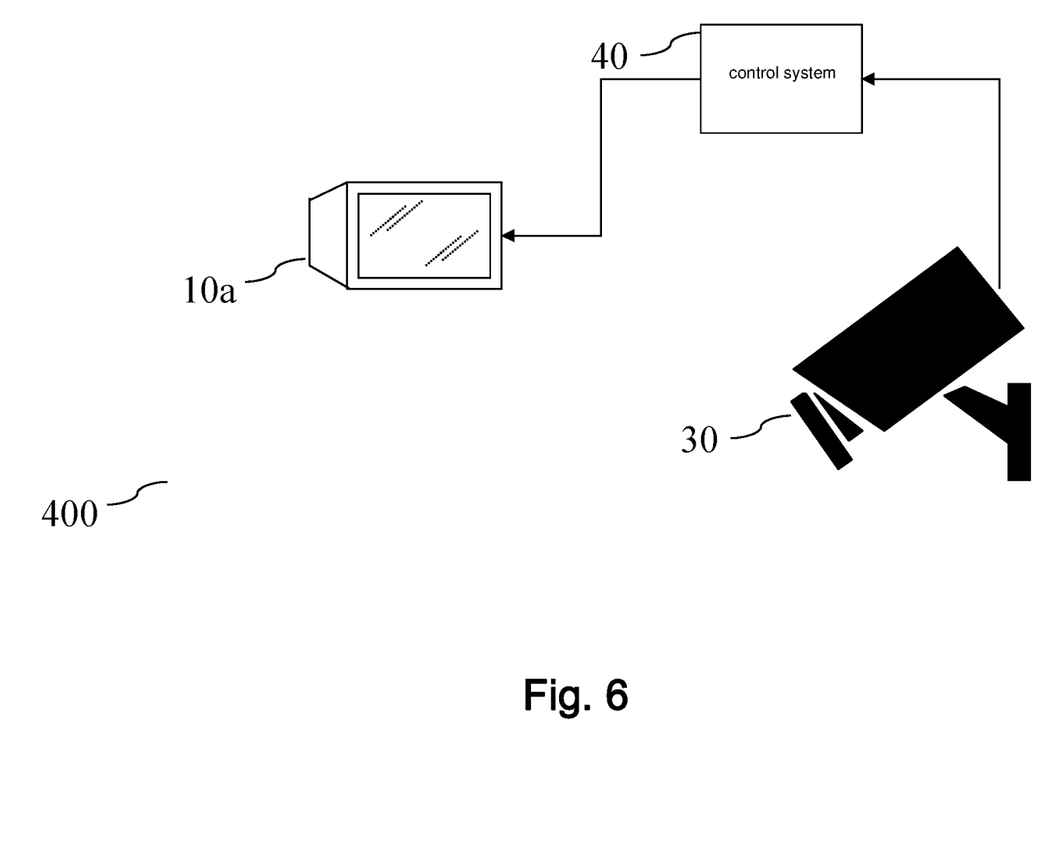
FIG. 6 shows the control system controlling a surveillance system, in accordance with an example embodiment of the present invention.

Shown in FIG. 6 is an embodiment in which the control system (40) controls a surveillance system (400). This embodiment is largely identical to the embodiment shown in FIG. 5. Therefore, only the differing aspects will be described in detail. Sensor (30) is configured to detect a scene that is under surveillance. The control system (40) does not necessarily control an actuator (10), but may alternatively control a display (10a). For example, the neural network (60) may determine a classification of a scene, e.g., whether the scene detected by an optical sensor (30) is suspicious. The actuator control signal (A), which is transmitted to the display (10a), may then, e.g., be configured to cause display (10a) to adjust the displayed content dependent on the determined classification, e.g., to highlight an object that is deemed suspicious by the neural network (60).

Figure 7:
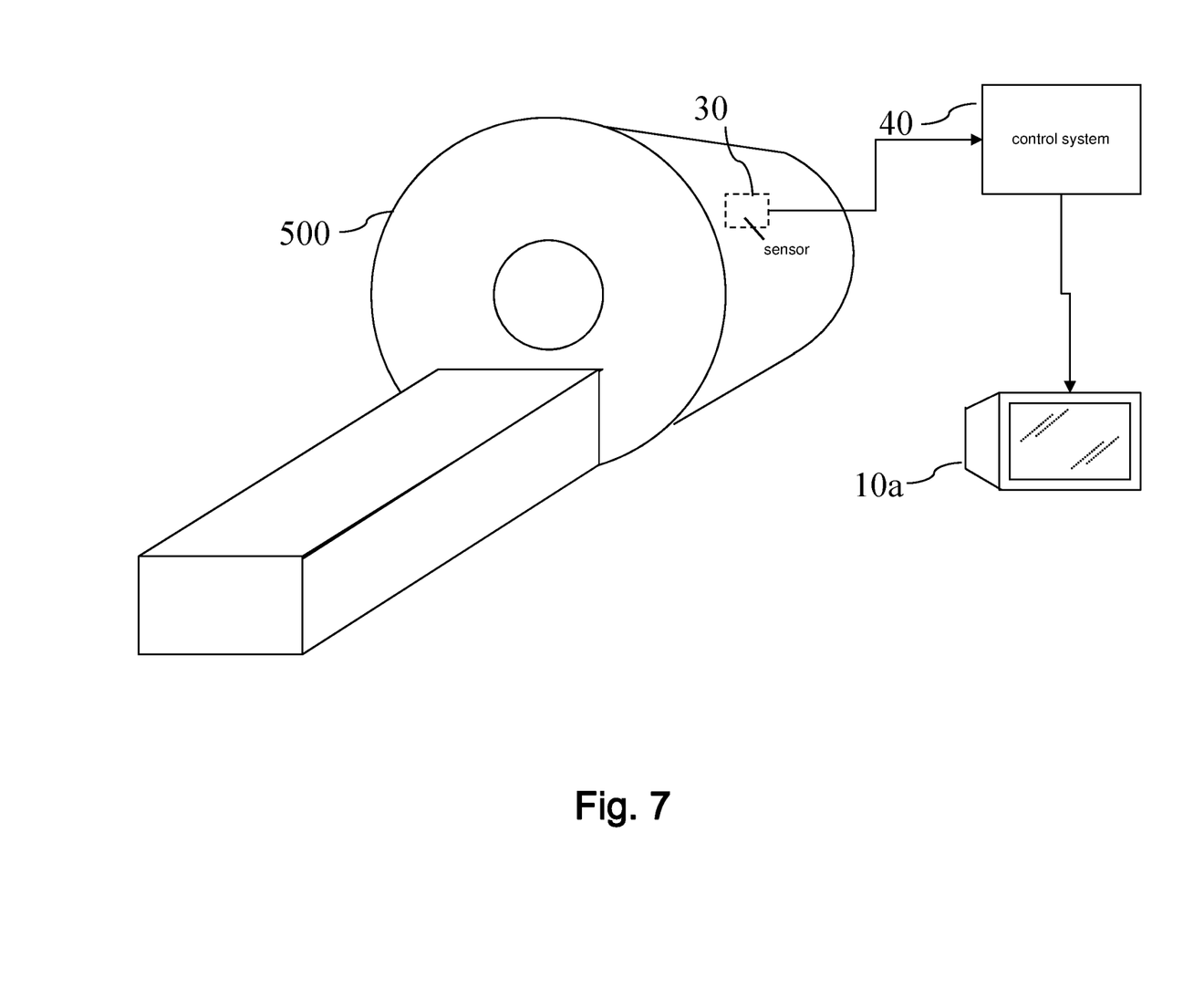
FIG. 7 shows the control system controlling an imaging system, in accordance with an example embodiment of the present invention.

Shown in FIG. 7 is an embodiment of a control system (40) for controlling an imaging system (500), for example an MRI apparatus, x-ray imaging apparatus or ultrasonic imaging apparatus. The sensor (30) may, for example, be an imaging sensor. The neural network (60) may then determine a classification of all or part of the sensed image. The actuator control signal (A) may then be chosen in accordance with this classification, thereby controlling a display (10a). For example, the neural network (60) may interpret a region of the sensed image to be potentially anomalous. In this case, the actuator control signal (A) may be determined to cause the display (10a) to display the image and highlighting the potentially anomalous region.

Figure 8:
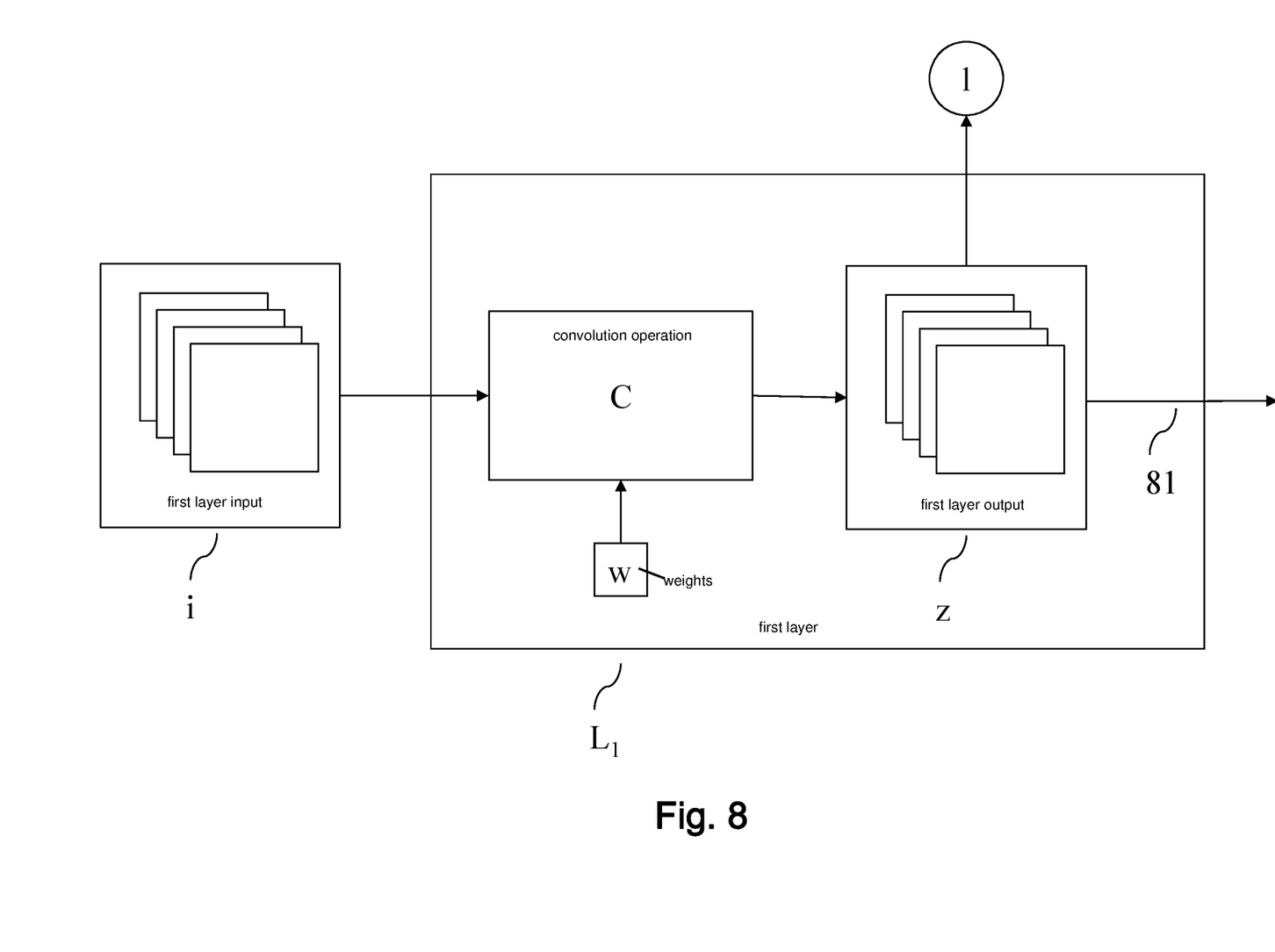
FIG. 8 shows a first layer of the classifier, in accordance with an example embodiment of the present invention.

Shown in FIG. 8 is an embodiment of a first layer ($L_1$) comprised in a neural network (60). The first layer ($L_1$) receives a first layer input (i). The first layer input (i) may be given as a tensor of predefined height, width and depth comprising data which can be considered a representation of the input signal (x) provided to the classifier. Alternatively, the first layer input (i) may also comprise such a representation of a plurality of input images, in which case the first layer input (i) is given as a batch of representations, preferably organized in a tensor of a predefined batch size, height, width and depth. Alternatively, the first layer input (i) may not comprise a width dimension, e.g., if the input signal (x) comprises one dimensional data such as, e.g., representations of audio data.

If the first layer input (i) comprises a height, width and depth dimension, the first layer output (z) can be obtained through a convolution operation (C), wherein the first layer input (i) is discretely convolved with a predefined amount of filters. The filters may be parametrized by a set of weights (w). Alternatively, of the first layer input (i) does not comprise a width dimension, the first layer output (z) may be obtained by a matrix multiplication of the first layer input (i) with a matrix (not shown), which is parametrized by a set of weights (w). This matrix multiplication may be envisioned as similar to processing a first layer input (i) with a fully connected layer in order to obtain a first layer output (z).

Having obtained the first layer output (z), a first layer loss value is obtained based on the feature maps comprised in the first layer output (z). The first layer loss value (z) may be obtained according to the formula:

$$l(i) = \log(p(z)) + \log\left(\left|\det\left(\frac{\partial z}{\partial i}\right)\right|\right),$$

$$p(z) = \prod_{j=1}^{C_{out}} A_j \cdot \exp\left(b_j \left(\sum z_j^2\right)^\alpha\right),$$

wherein $C_{out}$ is the number of feature maps in first layer output (z), $A_j$, $\alpha$ and $b_j$ are predefined values and $z_j$ is the j-th feature map.

The first layer output (z) may then be provided (81) to one or multiple other layers of the neural network (60). Alternatively, it may be used as output signal (y) of the neural network (60).

Figure 9:
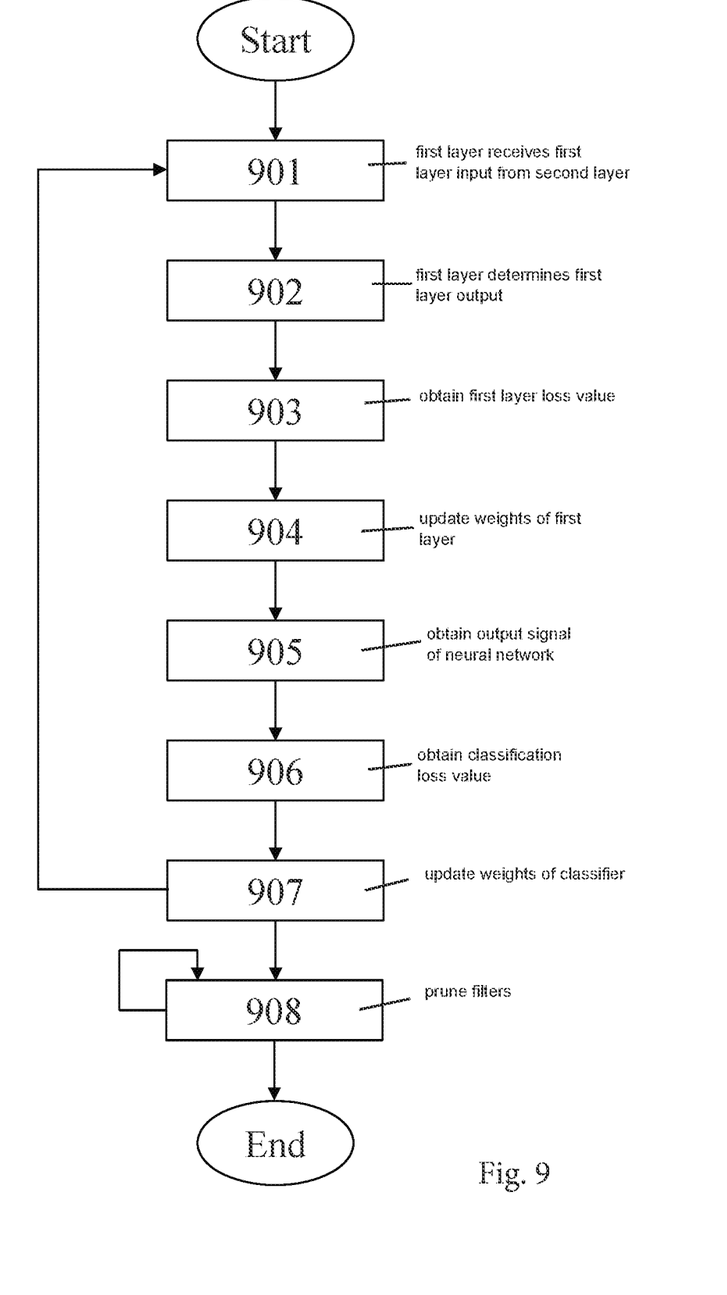
FIG. 9 shows a flow-chart diagram of a training method carried out by a training system, in accordance with an example embodiment of the present invention.

FIG. 9 shows a schematic flow diagram of a method for training a neural network (60) comprising a first layer ($L_1$). In a first step (901), the first layer ($L_1$) receives a first layer input (i) from a second layer of the neural network (60). Alternatively, the first layer input (i) may be provided to the first layer ($L_1$) by the input layer of the neural network (60). For example, the first layer input (i) may be the input signal (x) of the neural network (60) directly.

In a second step (902), a first layer output (z) may be determined by the first layer ($L_1$), e.g., as shown in FIG. 8 and, e.g., as described in the previous embodiment.

In a third step (903), a first layer loss value (1) may be obtained based on the first layer output (u), e.g., as shown in FIG. 8 and, e.g., as described in the previous embodiment.

In a fourth step (904), the weights (w) of the first layer ($L_1$) are updated by, e.g., obtaining a gradient of the first layer loss value (1) with respect to the input signal (x) and adapting the weights (w) according to the negative gradient.

In a fifth step (905), the output signal (y) of the neural network (60) is obtained based on the first layer output (z). This may be done by providing the first layer output (z) to a following layer which provides a following output. This following output may be forwarded through the rest of the neural network (60) as is common for feed-forward neural networks. Alternatively, it can be envisioned that the first layer output (z) is used as output signal (y) directly.

In a sixth step (906) a classification loss value is obtained based on the output signal (y). This may achieved by, e.g., applying the softmax function to the output signal (y) in order to obtain a set of probabilities. From these probabilities, a cross entropy value with respect to a desired classification may be computed. The cross entropy loss value may then be used as classification loss value.

In a seventh step (907), the weights of the classifier (preferably including the weights (w) of the first layer) may be updated such that the classification loss value decreases. This may be achieved by computing the gradient of the classification loss value with respect to the input signal (x) and updating the weights (preferably including the weights (w) of the first layer ($L_1$)) according to the negative gradient. The steps one (901) to (907) may then be repeated in an iterative fashion until a desired amount of iterations has passed. Alternatively, the steps may be repeated until the classification loss value becomes smaller than a predefined classification loss threshold.

In an eighth step (908), the filters of the first layer ($L_1$) may be pruned. This may, for example, be achieved by determining the filter corresponding to the feature map with the smallest norm, e.g., $L_2$-norm. This filter may then be discarded and the classifier may be fine-tuned in order to account for the change in network architecture. This can be achieved by, e.g., minimizing the classification loss value from the previous step using a training data set of input signals (x) until the classification loss value has become smaller than the classification loss threshold. The eight step (908) may be repeated in order to prune a predefined amount of filters from the first layer ($L_1$).

In a further embodiment (not shown) it may be envisioned, that the first (901), second (902) and third step (903) are repeated iteratively with different input signals (x) until a predefined number of iterations has been achieved. Alternatively, the iterations may be repeated until the first layer loss value (1) falls below a certain first layer loss threshold.

In both alternatives of this embodiment, the steps four (904) to eight (908) may then be executed afterwards. It can also be envisioned that after the iterative execution of the steps one (901) to three (903) as explained above, the training may proceed without updating the first layer loss value (1) but only the classification loss value.

What is claimed is:

1. A method for training a neural network, the neural network including a first layer, the first layer including a plurality of filters to provide a first layer output, the first layer output including a plurality of feature maps, the method comprising the following steps:
   receiving, from a preceding layer, a first layer input in the first layer, wherein the first layer input is based on the input signal;
   determining the first layer output based on the first layer input and a plurality of parameters of the first layer;
   determining a first layer loss value based on the first layer output, wherein the first layer loss value characterizes a degree of dependency between the feature maps of the first layer output, the first layer loss value being obtained in an unsupervised fashion; and
   training the neural network, including adapting the parameters of the first layer, the adaption being based on the first layer loss value.

2. The method according to claim 1, the method further comprising the following steps:
   determining an output signal of the neural network depending on the first layer output, wherein the output signal characterizes a classification of the input signal; and
   determining a classification loss value based on the output signal;
   wherein the training includes adapting the parameters of the first layer based on the classification loss.

3. The method according to claim 1, wherein the first layer loss value characterizes a factoring of a distribution of the first layer output between the feature maps.

4. The method according to claim 1, wherein the first layer loss value is determined according to the following formula:

$$l = \log(p(z)) + \log\left(\left|\det\left(\frac{\partial z}{\partial i}\right)\right|\right),$$
$$p(z) = \prod_{j=1}^{C_{out}} A_j \cdot \exp\left(b_j\left(\sum z_j^2\right)^\alpha\right),$$

wherein i is the first layer input (i), $C_{out}$ is a number of feature maps in first layer output (z), $A_j$, $\alpha$ and $b_j$ are predefined values and $z_j$ is a j-th feature map of the first layer output (z).

5. The method according to claim 4, wherein $A_i$ and/or $b_i$ and/or $\alpha$ are adapted during training of the neural network.

6. The method according to claim 1, wherein the determining of the first layer output includes padding the first layer input such that a size of the first layer output matches a size of the first layer input along a height and/or width and/or depth.

7. The method as recited in claim 1, the method further comprising the following step:
   pruning the filters of the first layer.

8. A computer-implemented method for controlling an actuator using a neural network, the neural network including a first layer, first layer including a plurality of filters to provide a first layer output including a plurality of feature maps, the neural network having been trained by receiving, from a preceding layer, a first layer input in the first layer, wherein the first layer input is based on the input signal, determining the first layer output based on the first layer input and a plurality of parameters of the first layer, determining a first layer loss value based on the first layer output, wherein the first layer loss value characterizes a degree of dependency between the feature maps of the first layer output, the first layer loss value being obtained in an unsupervised fashion, and training the neural network, including adapting the parameters of the first layer, the adaption being based on the first layer loss value, the method comprising:
   providing a second input signal to the trained neural network based on a sensor signal including data from a sensor; and
   providing an actuator control signal for controlling the actuator based on a second output signal of the trained neural network.

9. The method according to claim 8, wherein, based on the actuator control signal, the actuator controls an at least partially autonomous robot and/or a manufacturing machine and/or an access control system.

10. A non-transitory machine-readable storage medium on which is stored a computer program for training a neural network, the neural network including a first layer, the first layer including a plurality of filters to provide a first layer output, the first layer output including a plurality of feature maps, the computer program, when executed by a computer, causing the computer to perform the following steps:
   receiving, from a preceding layer, a first layer input in the first layer, wherein the first layer input is based on the input signal;
   determining the first layer output based on the first layer input and a plurality of parameters of the first layer;

determining a first layer loss value based on the first layer output, wherein the first layer loss value characterizes a degree of dependency between the feature maps of the first layer output, the first layer loss value being obtained in an unsupervised fashion; and training the neural network, including adapting the parameters of the first layer, the adaption being based on the first layer loss value.

11. A training system configured to train a neural network, the neural network including a first layer, the first layer including a plurality of filters to provide a first layer output, the first layer output including a plurality of feature maps, the control system configured to:

receive, from a preceding layer, a first layer input in the first layer, wherein the first layer input is based on the input signal;

determine the first layer output based on the first layer input and a plurality of parameters of the first layer;

determine a first layer loss value based on the first layer output, wherein the first layer loss value characterizes a degree of dependency between the feature maps of the first layer output, the first layer loss value being obtained in an unsupervised fashion; and train the neural network, including adapting the parameters of the first layer, the adaption being based on the first layer loss value.

* * * * *